(12) United States Patent
Lusted et al.

(10) Patent No.: US 9,455,797 B2
(45) Date of Patent: *Sep. 27, 2016

(54) NETWORK SYSTEM CONFIGURED FOR RESOLVING FORWARD ERROR CORRECTION DURING A LINK TRAINING SEQUENCE

(75) Inventors: Kent Lusted, Aloha, OR (US); Ilango Ganga, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 13/996,084

(22) PCT Filed: May 7, 2012

(86) PCT No.: PCT/US2012/036844
§ 371 (c)(1),
(2), (4) Date: Apr. 15, 2014

(87) PCT Pub. No.: WO2013/169229
PCT Pub. Date: Nov. 14, 2013

(65) Prior Publication Data
US 2014/0223265 A1 Aug. 7, 2014

(51) Int. Cl.
*H04L 1/00* (2006.01)

(52) U.S. Cl.
CPC .............. *H04L 1/004* (2013.01); *H04L 1/0009* (2013.01); *H04L 1/0017* (2013.01)

(58) Field of Classification Search
CPC .. H03M 13/35; H04L 1/0009; H04L 1/0017; H04L 1/004
See application file for complete search history.

(56) References Cited

U.S. PATENT DOCUMENTS

| 5,852,631 A * | 12/1998 | Scott | H04L 5/1438 375/222 |
| 6,182,264 B1 * | 1/2001 | Ott | H03M 13/09 714/774 |
| 8,320,411 B1 * | 11/2012 | Sedarat | H04W 52/365 370/241 |

(Continued)

FOREIGN PATENT DOCUMENTS

WO 2014112224 1/2014

OTHER PUBLICATIONS

International Search Report and Written Opinion received for PCT Patent Application No. PCT/US2012/036844, mailed on Feb. 20, 2013, 15 pages.

(Continued)

*Primary Examiner* — Steve Nguyen
(74) *Attorney, Agent, or Firm* — Grossman, Tucker, Perrault & Pfleger, PLLC.

(57) ABSTRACT

One embodiment provides a method for resolving a forward error correction (FEC) protocol. The method includes requesting, by a network node element during an auto-negotiation period between the node element and a link partner, to resolve at least one FEC mode during a link training period; wherein the auto-negotiation period and the link training period are defined by an Ethernet communications protocol and the auto-negotiation period occurs before the link training period; determining, by the network node element, at least one channel quality parameter of at least one channel of a communication link between the network node element and the link partner; and determining, by the network node element during the link training period, whether to enable at least one FEC mode for use by the network node element based on, at least in part, the at least one channel quality parameter.

30 Claims, 4 Drawing Sheets

(56) References Cited

U.S. PATENT DOCUMENTS

| | | | |
|---|---|---|---|
| 2006/0098683 A1* | 5/2006 | Thaler | H04L 5/1438 370/462 |
| 2007/0248181 A1* | 10/2007 | Clausen | H04B 15/02 375/285 |
| 2010/0229071 A1 | 9/2010 | Ganga et al. | |
| 2010/0262844 A1 | 10/2010 | Diab et al. | |
| 2010/0293441 A1* | 11/2010 | Booth | H04L 1/0083 714/776 |
| 2011/0138250 A1* | 6/2011 | Ganga | H03M 13/33 714/758 |
| 2011/0191657 A1 | 8/2011 | Bliss et al. | |
| 2011/0249686 A1* | 10/2011 | Langner | H04L 1/0002 370/465 |

OTHER PUBLICATIONS

Mike Dudek Qlogic, "Use of FEC in PAM2 Backplane and Copper", Mar. 2012, 6 pages. web page available at: http://www.ieee802.org/3/bj/public/mar12/dudek_02a_0312.pdf.

International Search Report and Written Opinion received for PCT Patent Application No. PCT/US2013/030820, mailed on May 23, 2013, 10 pages.

Marris, "Baseline Proposal for 802.3bj Auto-Negotiation", 100 Gb/s Backplane and Copper Cable Task Force Newport Beach Interim Meeting, Jan. 2012.

"A Few notes on FEC", 100 Gb/s Backplane and Copper Cable Task Force, Waikoloa Plenary Meeting Mar. 2012.

International Preliminary Report on Patentability and Written Opinion received for PCT Patent Application No. PCT/US2012/036844, mailed on Nov. 20, 2014, 7 pages.

International Preliminary Report on Patentability and Written Opinion Received for PCT Patent Application No. PCT/US2013/030820, mailed on Jan. 22, 2015, 8 pages.

Office Action received for Korean Patent Application No. 2014-7031258, mailed on Mar. 3, 2016, 6 pages of English translation and 6 pages of Korean Office Action.

* cited by examiner

NETWORK SYSTEM CONFIGURED FOR RESOLVING FORWARD ERROR CORRECTION DURING A LINK TRAINING SEQUENCE

FIELD

The present disclosure relates to a network system configured for resolving forward error correction, and, more particularly, a network system configured for resolving forward error correction enablement during a link training sequence.

BACKGROUND

Some conventional Ethernet network systems support optional Forward Error Correction (FEC) protocols as an additional measure of packet integrity, which may be useful on channels having marginal quality. FEC protocols are processor intensive, and enabling FEC protocols typically degrades system performance, latency and increase the overall power demand of a network node. In the conventional Ethernet approach, FEC protocols are enabled during an auto-negotiation period between link partners. However, the auto-negotiation period is typically agnostic to the actual quality of the channels between link partners. Instead, channel quality is measured during a link training sequence, which is performed after the auto-negotiation period. Thus, the conventional approach may inappropriately enable FEC (or an FEC mode) on a network segment (two or more network nodes), even if the communication channel is later determined to be of sufficient quality to support a given link speed without FEC protocols enabled. Thus, enabling FEC protocols in conventional Ethernet network systems may unnecessarily degrade system performance and latency and increase the overall power demand of the network segment.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure relates to network systems (and methods) configured to resolve an FEC capability during a link training period, rather than during an auto-negotiation period. A network node element and a link partner are configured to exchange, during an auto-negotiation period defined by an Ethernet communications protocol, capabilities and agree upon common capabilities and speeds. During the auto-negotiation period, the respective FEC capabilities of the node element and link partner are identified, and the node element requests to resolve and enable identified FEC capabilities during the link training period. During the link training period, link quality is determined, and, based on the channel quality, a determination is made whether to enable a selected FEC capability for use by the node element and/or the link partner. Thus, unnecessary enablement of FEC capabilities may be avoided, since the channel quality is determined before such enablement. For communications links with multiple channels, the link quality may be determined on a channel-by-channel basis, and each node element may asynchronously enable different FEC capabilities, based on individual channel quality measurements.

Figure 1:
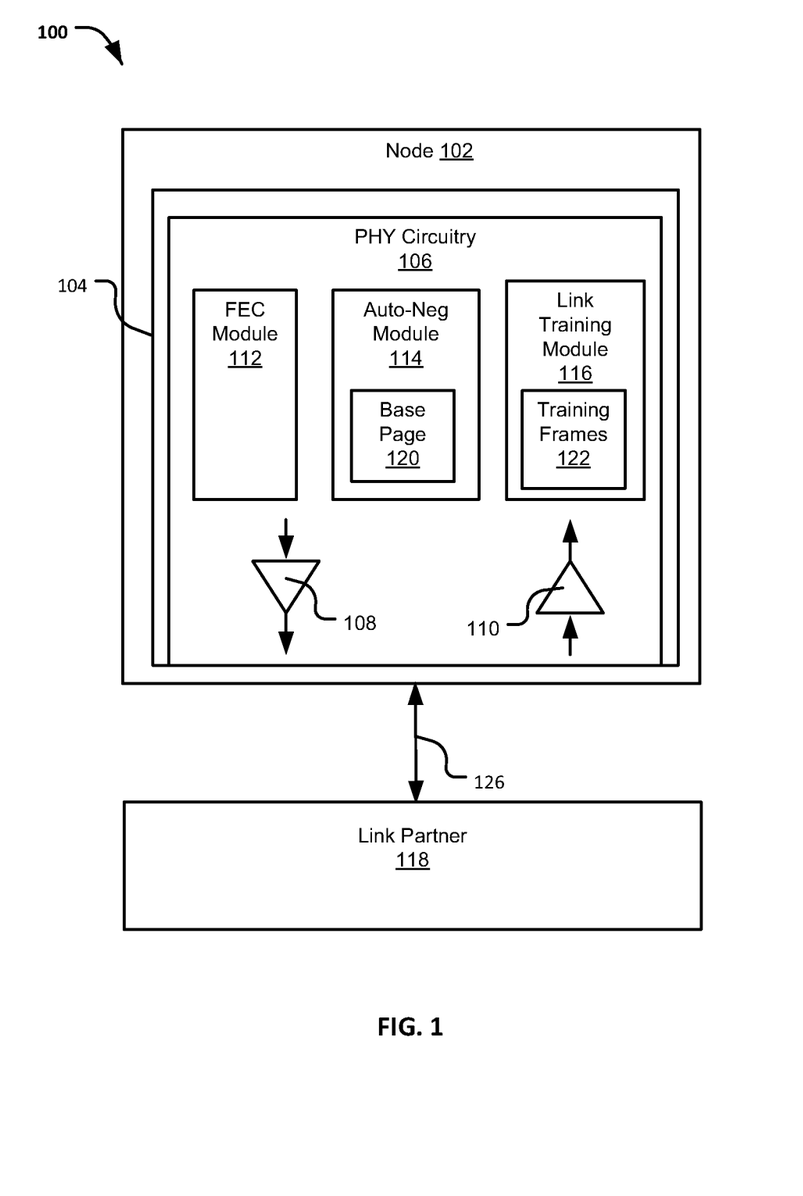
FIG. 1 illustrates a network system consistent with various embodiments of the present disclosure.

FIG. 1 illustrates a network system 100 consistent with various embodiments of the present disclosure. Network system 100 generally includes at least one network node element 102 and at least one link partner 118, each configured to communicate with one another via communications link 126. The network node element 102 and the link partner 118 may communicate with each other, via link 126, using an Ethernet communications protocol. The Ethernet communications protocol may be capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard, for example, the IEEE 802.3 Standard, published 2008. The link partner 118 and/or node element 102 may represent a computer node element (e.g., host server system), switch, router, hub, network storage device, network attached device, etc. The link partner 118 may be configured and operate in a similar manner as the node 102, as described in greater detail below.

Node 102 generally includes a network controller 104 configured to communicate with the link partner 118 using the aforementioned Ethernet communications protocol. Network controller 104 is also generally configured to perform various operations in a defined order when a link is first established with the link partner 118 (e.g., upon system initialization, establishing a new link with the link partner, etc.). Such operations may include, for example, an auto-negotiation period during which various capabilities of the node 102 and the link partner 118 are exchanged, followed by a link training period during which the quality of the communications link 126 may be determined. The auto-negotiation period and link training period may be defined under the aforementioned IEEE 802.3 communications protocol.

The network controller 104 includes PHY circuitry 106 generally configured to interface the node 102 with the link partner 118, via communications link 126. PHY circuitry 106 may comply or be compatible with, the aforementioned IEEE 802.3 Ethernet communications protocol, which may include, for example, 10 GBASE-KR, 40 GBASE-KR4, 40 GBASE-CR4 and/or 100 GBASE-CR10 and/or other PHY circuitry that is compliant with the aforementioned IEEE 802.3 Ethernet communications protocol and/or an after-developed communications protocol. PHY circuitry 106 includes transmit circuitry (Tx) 108 configured to transmit data packets and/or frames to the link partner 118, via link 126, and receive circuitry (Rx) 110 configured to receive data packets and/or frames from the link partner 118, via link 126. Of course, PHY circuitry 106 may also include encoding/decoding circuitry (not shown) configured to perform analog-to-digital and digital-to-analog conversion, encoding and decoding of data, analog parasitic cancellation (for example, cross talk cancellation), and recovery of received data. Rx circuitry 110 may include phase lock loop circuitry (PLL, not shown) configured to coordinate timing of data reception from the link partner 118. The communications link 126 may comprise, for example, a media dependent interface which may include, for example, copper twin-axial cable, backplane traces on a printed circuit board, etc. In some embodiments, the communications link 126 may include a plurality of logical and/or physical channels (e.g., differential pair channels) that provide separate connections between, for example, the Tx and Rx 108/110 of the node 102 and an Rx and Tx, respectively, of the link partner 118. Network controller 104 also includes a forward error correction (FEC) module 112 configured to perform forward error correction operations on packets sent and/or received by the network controller 104.

In general, according to the aforementioned IEEE 802.3 Ethernet communications protocol, FEC operations include encoding of transmit data stream into an FEC frame (e.g. computation and inclusion of parity check symbols in the FEC encoded frame), and performing a data integrity check (e.g., recomputation of parity on received FEC frame and comparing against received parity symbols) and error correction, and decoding of received data stream. FEC is generally employed when the quality of the communications link 126 is below a threshold (e.g., a bit error bit error ratio (BER) threshold, etc.), and may be utilized in addition to other integrity checks that may be performed on a packet-by-packet basis (e.g., CRC, hash, etc.). The FEC module 112 may be configured to perform a plurality of FEC protocols or modes, as may be defined by the aforementioned IEEE 802.3 Ethernet communications protocol. For example, the FEC module 112 may be configured to perform operations of a "light" FEC mode in which the error correction (coding gain) and latency are set to a minimal or low threshold. As another example, the FEC module 112 may be configured to operate a "heavy" FEC mode in which the coding gain is set to a maximal or high threshold. The "light" FEC mode may generally offer reduced processing burden and less error correction and detection (hence lower latency and power) over the "heavy" FEC mode, at the possible expense of increased packet errors. As another example, the FEC module 112 may contain multiple FEC modes and may be configured to operate with appropriate FEC mode that is optimized for a given medium (e.g. backplane copper traces or copper twin-axial cables) used for the communication link 126. FEC uses the coding gain to increase the link budget and BER performance on a given channel. The link budget consists of the electrical parameters which define the connection between the 2 nodes, such as insertion loss, return loss, pulse response, etc. In general, there are tradeoffs for selecting a FEC scheme such as latency, power, error correction & detection capability, ease of implementation, etc. A "heavy" FEC code is capable of more error correction & detection than a "light" code at the expense of power, latency and ease of implementation. The amount of coding gain of the FEC could be selected to meet the minimum link budget and BER performance for a given medium.

Network controller 104 also includes an auto-negotiation module 114 configured to perform auto-negotiation operations between the node 102 and link partner 118. The auto-negotiation operations may be defined by the aforementioned IEEE 802.3 Ethernet communications protocol. In general, module 114 is configured to communicate to the link partner 118 a defined set of capabilities of the node 102. The defined set of capabilities may include, for example, PHY technology abilities, maximum link speed, next page, remote fault, Acknowledge, FEC and/or FEC mode capabilities, Pause ability, etc., as may be defined by the aforementioned IEEE 802.3 Ethernet communications protocol. Likewise, the link partner 118 is configured to communicate to the node 102 the defined set capabilities of the link partner 118. The exchange of capabilities between the node 102 and link partner 118 occurs within a defined auto-negotiation time period. The module 114 may be configured to format a link codeword base page (base page) 120 to define the capabilities of the node 102. The base page 120, defined by the aforementioned IEEE 802.3 Ethernet communications protocol, is a data structure (e.g., 48-bit frame) in which certain bits are utilized to convey defined capabilities of the node 102. According to the teachings of the present disclosure, the bit that is conventionally used for defining an FEC capability (e.g., bit 46) and the bit that is conventionally used to request enabling the FEC mode during the auto-negotiation period (e.g., bit 47) may be reassigned. In contrast to the conventional Ethernet communications protocol, the module 114 may be configured to modify the base page 120 to specify support for a plurality of FEC modes. For example, regarding FEC protocols and/or FEC modes, the base page 120 may be modified to include two bits (e.g., bits 46 and 47) that may be used to identify FEC capabilities and/or FEC modes that are supported by the network controller 104. For example, if bits 46 and 47 are set to 0, this indicates that the node 102 is not configured for FEC operations. If bit 46 is set to a 0 and bit 47 is set to a 1, this indicates that node 102 is configured to operate in a first FEC mode (e.g., "light" FEC mode); if bit 46 is set to 1 and bit 47 is set to 0, this indicates that node 102 is configured to operate in a second FEC mode (e.g., "heavy" FEC mode); and if bits 46 and 47 are both set to 1, this indicates that node 102 is configured to operate in the first and/or second FEC mode (e.g., "light" and "heavy" FEC modes). Of course, module 114 may be configured to modify additional bits of the base page 120 to support other/additional FEC modes.

In the conventional Ethernet communications protocol, the quality of the communications link 126 is not determined during the defined auto-negotiation period, but the FEC capabilities and/or modes are enabled during the defined auto-negotiation period, if such enablement is specified by the base page 120. In contrast to the conventional Ethernet communications protocol, according to the teachings presented herein, the module 114 is further configured to format the base page 120 to indicate a request to resolve the enablement of a specified FEC capability and/or FEC mode during a link training period, instead of during the auto-negotiation period. "Resolve" or "resolution", as used herein in this context, means a determination of whether to enable a specified FEC mode, and such determination may be based on a channel quality parameter. The base page 120 may include a "reserved" data field (e.g., one or more bits that are specified but unused in the Ethernet communications protocol) defined by the aforementioned IEEE 802.3 Ethernet communications protocol. In an embodiment, the module 114 is configured to format the base page 120 with a request flag, for example, by setting one or more bits of the reserved data field of the base page 120. In one example, the base page 120 may include a 16-bit reserved portion (e.g., bits 30-45). To support at least two different FEC modes, module 114 may be configured to use bits 44 and 45 as the FEC request flag. Thus, for example, if bits 44 and 45 are both set to 0, this may indicate that node 102 is incapable or otherwise unable to resolve FEC during the training sequence period. If bits 44 bits 45 are set to 0 1, this may indicate a request by node 102 to resolve FEC during the link training period, and that only a first FEC mode is supported. If bits 44 bits 45 are set to 1 0, this may indicate a request by node 102 to resolve FEC during the link training period, and that a first and second FEC mode is supported. Of course, these are only examples of the types of flags that may be set in the base page 120, and in other embodiments, other predefined bit orders may be used to define an FEC mode request. In still other embodiments, the number of bits utilized in the reserved portion of the base page 120 may be dependent upon the number of defined FEC modes (as may be defined by the Ethernet communication protocol), and thus, additional FEC mode support may be established by setting additional bits in the reserved portion of the base page 120. The formatted base page 120 is transmitted to the link partner 118, and a similar base page (not shown) is transmitted from the link partner 118 to the node 102.

The node 102 and link partner 118 may be configured to concur to delay resolving FEC modes until the link training period, for example, by exchanging acknowledgements, the expiration of timers, training protocols reaching a failure state, etc. In some embodiments, the FEC mode requested by the node 102 may be different than an FEC mode requested by the link partner 118. In such embodiments, the node 102 and link partner 118 may acknowledge such a state, and each may enable different FEC operation modes (e.g., asymmetric FEC mode enablement, described in greater detail below). Of course, during the auto-negotiation period, other parameters may be established such as PHY type including maximal link speed, Pause ability, next page, remote fault, Acknowledge, etc. Assuming that the link partner 118 is configured in a similar manner as the node 102, similar operations as described above may be performed by the link partner 118.

Network controller 104 also includes a link training module 116 configured to perform link training operations between the node 102 and link partner 118. In general, link training operations may be used to determine at least one channel quality parameter of at least one channel of the communications link 126. Examples of channel quality parameters include: bit error ratio (BER), signal-to-noise ratio (SNR), cross talk, environmental noise, linearity, impulse response, etc. The link training module 116 is configured to perform link training operations during a link training period, as defined by the aforementioned IEEE 802.3 Ethernet communications protocol. The link training period occurs after the auto-negotiation period. The link training module 116 is also configured to resolve the enablement of an FEC mode (specified in the base page 120, described above) to be used by the node 102 during packet transfers.

In operation, during the link training period, the node 102 and link partner 118 are each configured to exchange selected signals and/or packets and/or frames to determine, at least in part, at least one channel quality parameter. The link training operations may be defined by the aforementioned IEEE 802.3 Ethernet communications protocol, and may include, for example, obtaining a frame lock between the node 102 and link partner 118, Tx feed-forward equalization (FFE) handshake operations to provide adaptation of transmission coefficients to channel characteristics, digital signal processing convergence to "train" the respective Rx circuitry of the node 102 and link partner 118 to the respective Tx circuitry, which provides coefficient update information to the transmitter so that the transmitter can adjust its transmit equalizer coefficients to optimum values suitable for the particular channel. In addition, the module 116 is configured to analyze the quality of a received signal on a given channel using various techniques to generate one or more channel quality parameters (described below).

In addition, the module 116 may be configured to format training frames 122 to enable the training operations and to enable resolution of a defined FEC protocol and/or FEC mode. The training frames 122, defined by the aforementioned IEEE 802.3 Ethernet communications protocol, are defined data structures that include, for example, a delimited, fixed 4 octet frame marker. The training frames 122 typically include the following fields: a frame marker field, a coefficient update field, status report field and a training pattern field. In response to the request to delay resolution of an FEC mode during the auto-negotiation period (described above), the module 116 is further configured to format the training frames 122 to indicate an FEC mode that may be enabled after the determination of at least one channel quality parameter of at least one channel of the communications link 126. In one embodiment, a reserved data field in the coefficient update field and/or status report field may be formatted with an FEC mode enablement flag to indicate at least one FEC mode for at least one communication channel. For example, the coefficient update field of the training frames 122 includes a plurality of reserved bits, and one or more of these reserved bits may be formatted by module 116 to set a flag to indicate an FEC mode for at least one channel. In another example, the status report field of the training frames 122 includes a plurality of reserved bits, and one or more of these reserved bits may be formatted by module 116 to set a flag to indicate an FEC mode for at least one channel. Of course, in some other embodiments, other portions of the training frames 122 may be formatted with an FEC enablement flag. The training frames may be exchanged between the node 102 and link partner 118 (e.g., using in-band and/or out-of-band (OOB) communication techniques) during the link training period.

Certain custom and/or predefined techniques may be used to provide an analysis of the quality of a received signal on a given channel. For example, the link training module 116 may be configured to control various circuitry of the node 102 to perform a link side loopback procedure to determine at least one channel quality parameter. As another example, the system 100 may be configured to designate, during the auto-negotiation period, a master/slave relationship between the node 102 and link partner 118, and then during the link training period the master may be configured to instruct the slave to loopback after a predefined test timeout period (or generate a designated character), indicate the transition using the designated channel, and initiate loopback operations on the master side. As another example, the link training module 116 may be configured to generate an "eye test" template to determine if test signals received the Rx are of sufficient quality circuitry. As another example, the link training module 116 may be configured to generate on/off sequences of the Tx circuitry and determine channel crosstalk parameters. In yet another example, the link training module 116 may be configured to obtain information from attached medium, such as non-volatile storage media or mass storage media. In still another example, the link training module 116 may be configured to perform a time domain reflectometry (TDR) test to determine signal reflectivity on a given channel between the node 102 and link partner 118. Of course, these are only examples of the techniques that may be used to provide an analysis of the link quality, and these techniques and/or other defined and/or custom/proprietary techniques may be used by the link training module 116. Selection of one or more such techniques may be based on, for example, the network system environment, the specified PHY circuitry, known channel quality limitations, etc.

In operation, the auto-negotiation module 114 is configured to negotiate, during the auto-negotiation period with the link partner, the request to resolve enablement of an FEC mode during the link training period. Once the auto-negotiation period is completed, the link training module 116 is configured to, among other things, determine at least one channel quality parameter of at least one channel and, based on the channel quality parameter, determine whether to enable at least one FEC mode for use by the network controller 104. For example, although a certain FEC mode may be specified by the base page 120, the link training module 116 may determine that, based on a channel quality parameter, the channel is of sufficient quality to support a selected link speed without the need for additional FEC operations. In such a case, the link training module 116 may disable the specified FEC mode. As another example, the link training module 116 may determine that, based on a channel quality parameter, the channel quality will support a reduced-overhead FEC mode (e.g., channel quality will support a "light" FEC mode rather than a specified "heavy" FEC mode). In this case, the link training module may enable the "light" FEC mode, instead of the "heavy" FEC mode specified by the base page 120. These operations may offer significant advantage of processing overhead and throughput speed. Of course, the link partner 118 may be configured to operate in a similar manner.

As noted above, the link training module 116 may be configured to determine channel quality parameters on a channel-by-channel basis, or the channel quality parameters may be determined over the communications link as a whole. For example, a given PHY specification may specify a certain number of channels between the node 102 and the link partner 118. Determining channel quality parameters on a channel-by-channel basis may reveal that certain channels have better quality than others. To that end, the link training module 116 may also be configured to enable different FEC modes for different channels, based on, at least in part, the channel quality parameters of the respective channels. Determining channel quality parameters on a channel-by-channel basis may also permit asynchronous FEC modes to operate between the node 102 and link partner 118. For example, assume that there are two channels between the node 102 and link partner 118, and that the Rx circuitry of both the node 102 and link partner 118 each supports two FEC modes (e.g., "light" and "heavy" FEC modes). After channel quality determination for each of these two channels, it may be revealed that the Rx channel of the node 102 has better quality than the Rx channel of the link partner. The link training module 116 may enable a first FEC mode for the Rx channel (and the link partner 118 may enable the first FEC mode for the corresponding Tx channel), and similarly, the link partner 118 may enable a second FEC mode for the Rx channel associated with the link partner 118 (and the node 102 may enable the second FEC mode for the corresponding Tx channel). Thus, for a given link 126 with multiple channels, multiple FEC modes may be employed on a channel-by-channel basis, based on a channel quality parameter. Of course, this is only one example of asynchronous enablement of FEC modes that may be realized by the teachings of the present disclosure.

Figure 2:
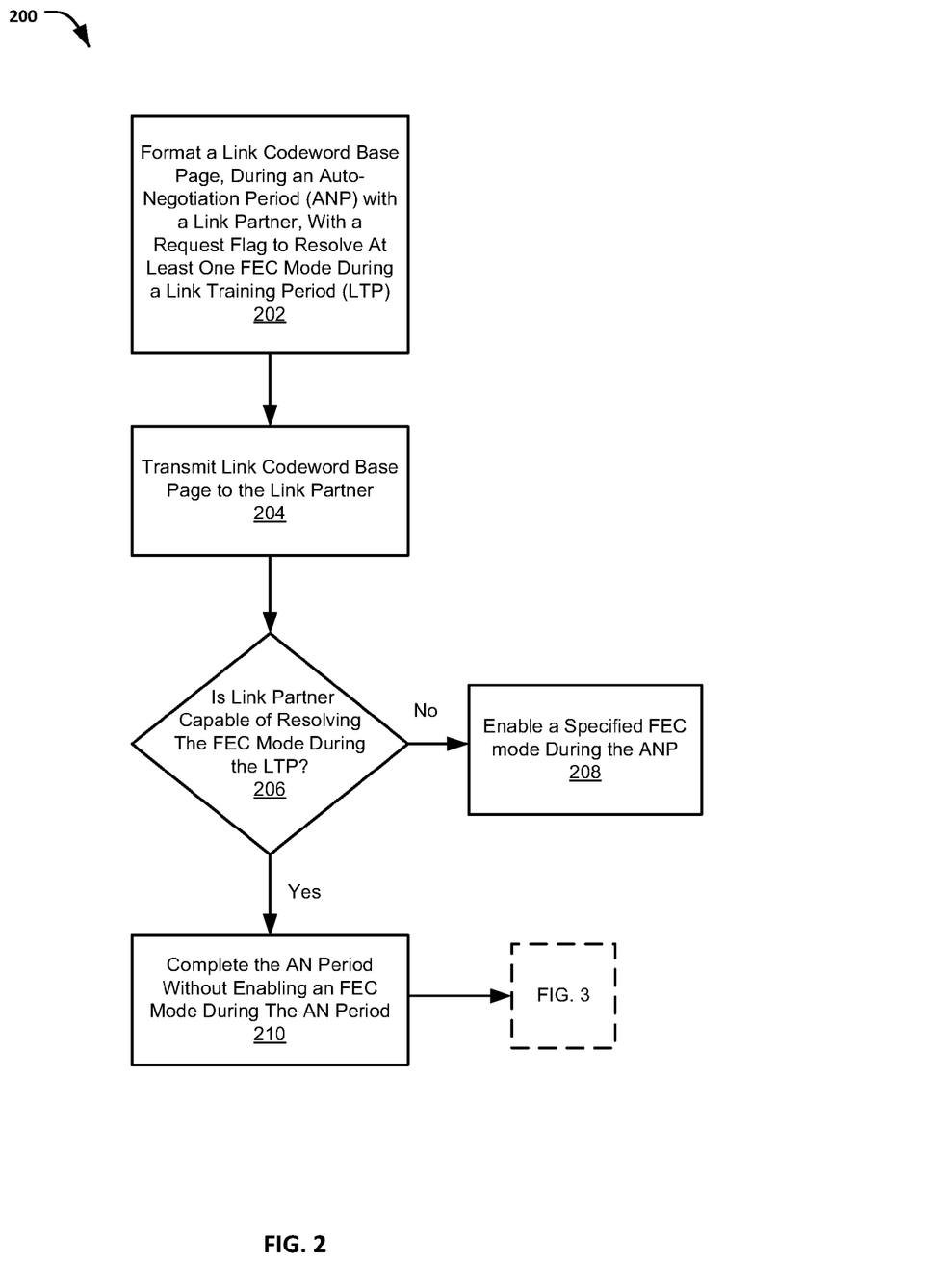
FIG. 2 is a flowchart of operations according to one embodiment of the present disclosure.

FIG. 2 is a flowchart of operations 200 according to one embodiment of the present disclosure. In particular, the flowchart 200 illustrates operations of a node element during an auto-negotiation period. Operations of this embodiment include formatting a link codeword base page, during an auto-negotiation period with a link partner, with a request to resolve at least one forward error correction (FEC) mode during a link training period 202. The link training period occurs after the auto-negotiation period. Operations also include transmitting the link codeword base page to the link partner 204. Operations further include determining if the link partner is capable of resolving the FEC mode during the link training period 206. If the link partner is incapable of resolving the FEC mode during the link training period, operations may also include enabling a specified FEC mode during the auto-negotiation period 208. If the link partner is so capable, the auto-negotiation period may be completed without enabling an FEC mode during the auto-negotiation period 210.

Figure 3:
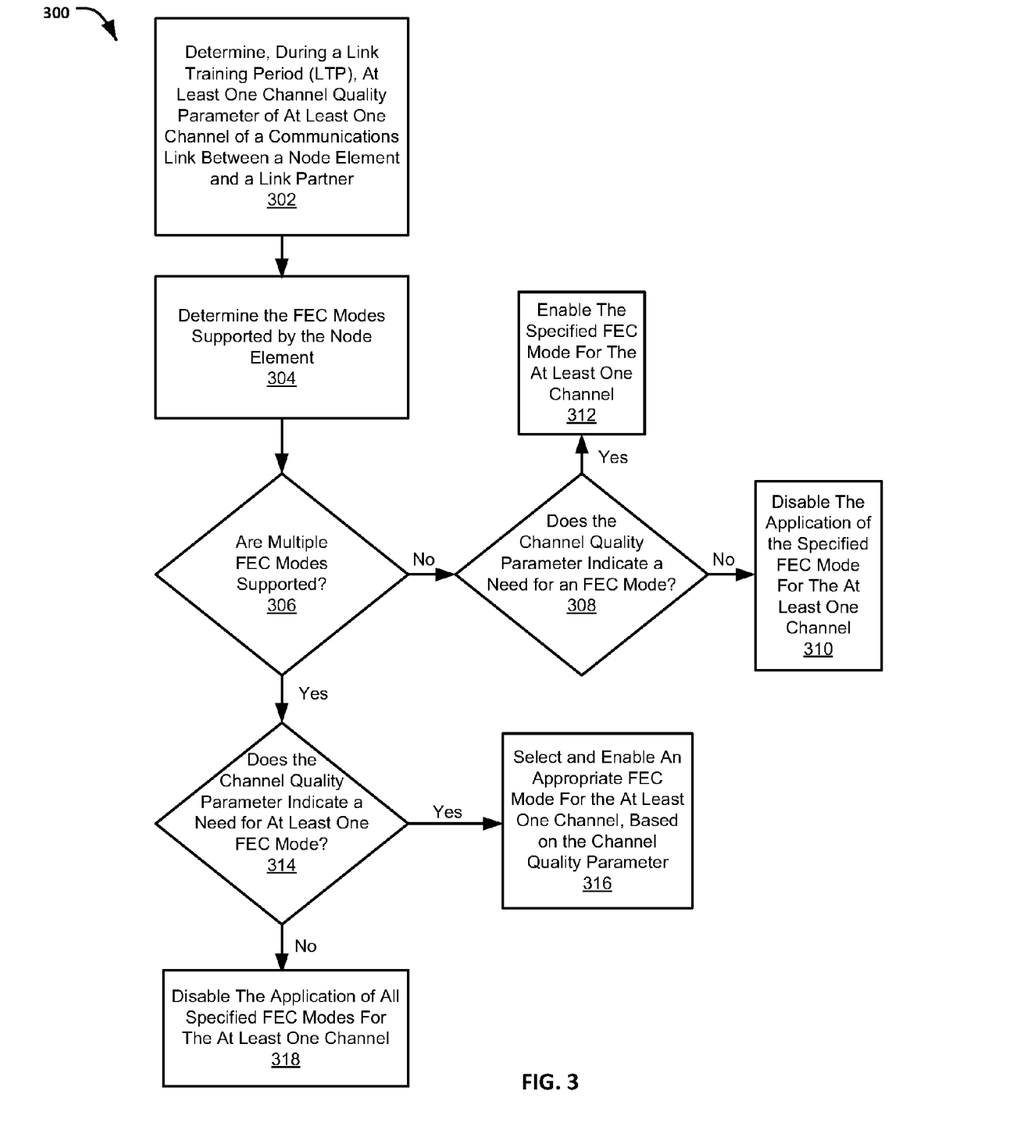
FIG. 3 is a flowchart of operations according to another embodiment of the present disclosure.

FIG. 3 is a flowchart of operations 300 according to another embodiment of the present disclosure. In particular, the flowchart 300 illustrates operations of a node element during a link training period. Operations of this embodiment include determining, during a link training period, at least one channel quality parameter of at least one channel of a communications link between a network node element and a link partner 302. Operations also include determining the FEC modes supported by the node element 304 and determining if multiple modes are supported by the node element 306. If only a single FEC mode is supported, operations may also include determining if the at least one channel quality parameter is indicative of a need for the supported FEC mode 308. If the channel would require additional packet integrity provided by the FEC mode, operations may also include enabling the specified FEC mode for the at least one channel for use by the node element 312. If the channel is of sufficient quality that FEC is not required, operations may include disabling the application of the specified FEC mode for the at least one channel 310. If multiple FEC modes are supported by the node element (306), operations may also include determining if the at least one channel quality parameter is indicative of a need for at least one supported FEC mode 314. If the channel would require additional packet integrity provided by at least one of the FEC mode, operations may also include selecting an appropriate FEC mode and enabling the selected FEC mode, based on the at least one channel quality parameter, for the at least one channel for use by the node element 316. If the channel is of sufficient quality that none of the FEC modes are required, operations may include disabling the application of the all FEC mode for the at least one channel 318.

Figure 4:
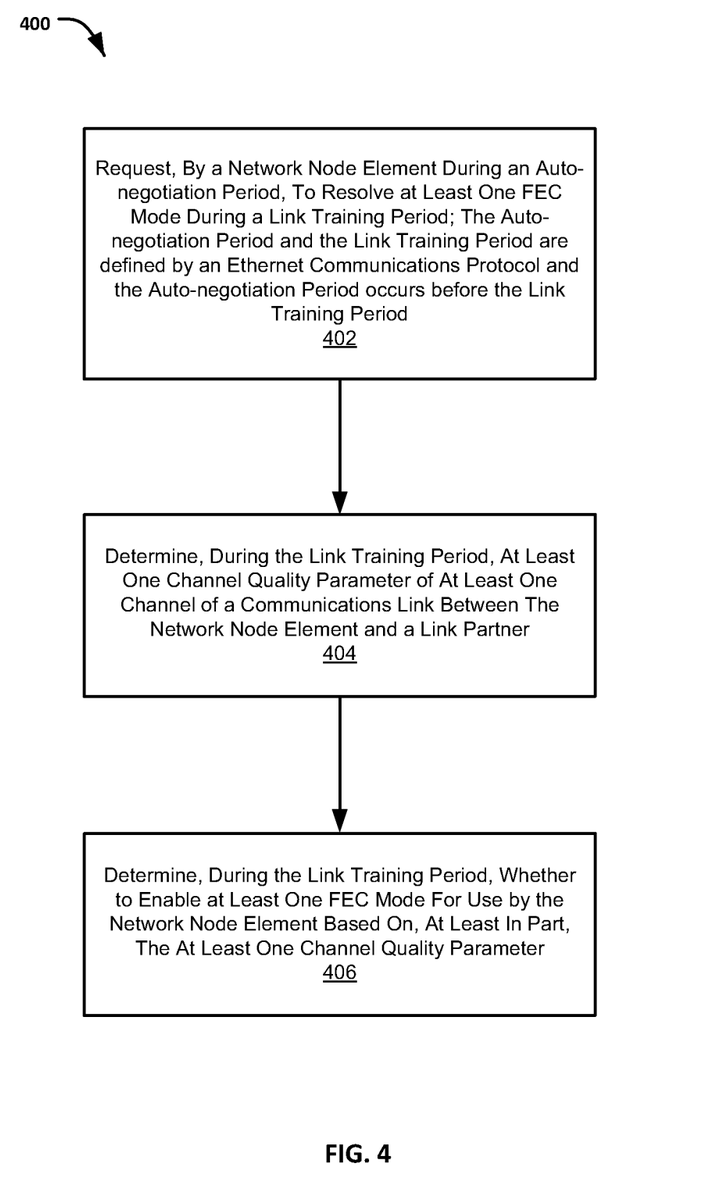
FIG. 4 is a flowchart of operations according to another embodiment of the present disclosure.

FIG. 4 is a flowchart of operations 400 according to another embodiment of the present disclosure. In particular, the flowchart 400 illustrates operations of a node element during an auto-negotiation period and a link training period. Operations of this embodiment include requesting, by the network node element during an auto-negotiation period, to resolve at least one FEC mode during a subsequent link training period 402. The auto-negotiation period and link training period are defined by an Ethernet communications protocol, and the auto-negotiation period occurs before link training period. Operations may also include determining, during the link training period, at least one channel quality parameter of at least one channel of a communications link between a network node element and a link partner 404. Operations may also include determining, during the link training period, whether to enable at least one FEC mode for used by the network node element based on, at least in part, the at least one channel quality parameter 406.

While the flowcharts of FIGS. 2, 3 and 4 illustrate operations according various embodiments, it is to be understood that not all of the operations depicted in FIG. 2, FIG. 3 and/or FIG. 4 are necessary for other embodiments. In addition, it is fully contemplated herein that in other embodiments of the present disclosure, the operations depicted in FIG. 2, FIG. 3, FIG. 4 and/or other operations described herein may be combined in a manner not specifically shown in any of the drawings, and such embodiments may include less or more operations than are illustrated in FIG. 2, FIG. 3 and/or FIG. 4. Thus, claims directed to features and/or operations that are not exactly shown in one drawing are deemed within the scope and content of the present disclosure.

The foregoing is prided as exemplary system architectures and methodologies, modifications to the present disclosure are possible. For example, node 102 and/or link partner 118 may also include a host processor, chipset circuitry and system memory. The host processor may include one or more processor cores and may be configured to execute system software. System software may include, for example, operating system code (e.g., OS kernel code) and local area network (LAN) driver code. LAN driver code may be configured to control, at least in part, the operation of the network controller 104. System memory may include I/O memory buffers configured to store one or more data packets that are to be transmitted by, or received by, network controller 104. Chipset circuitry may generally include "North Bridge" circuitry (not shown) to control communication between the processor, network controller 104 and system memory.

For example, node 102 and/or link partner 118 may further include an operating system (OS, not shown) to manage system resources and control tasks that are run on, e.g., node 102. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated subsystem such as, for example, a TCP offload engine and/or network controller 104. The TCP offload engine circuitry may be configured to provide, for example, packet transport, packet segmentation, packet reassembly, error checking, transmission acknowledgements, transmission retries, etc., without the need for host CPU and/or software involvement.

The system memory may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Embodiments of the operations described herein may be implemented in a system that includes one or more storage mediums having stored thereon, individually or in combination, instructions that when executed by one or more processors perform the methods. The processor may include, for example, a processing unit and/or programmable circuitry in the network controller 104 and/or other processing unit or programmable circuitry. Thus, it is intended that operations according to the methods described herein may be distributed across a plurality of physical devices, such as processing structures at several different physical locations. The storage medium may include any type of tangible, non-transitory storage medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. "Module", as used herein, may comprise, singly or in any combination circuitry and/or code and/or instructions sets (e.g., software, firmware, etc.).

Accordingly, the present disclosure provides an example network node element that includes a network controller configured to communicate with a link partner using an Ethernet communications protocol. The network controller is further configured to request, during an auto-negotiation period, to resolve at least one forward error correction (FEC) mode during a link training period; wherein the auto-negotiation period and the link training period are defined by an Ethernet communications protocol and the auto-negotiation period occurs before the link training period. The network node element is further configured to determine, during the link training period, at least one channel quality parameter of at least one channel of a communication link between the network controller and the link partner; and determine, during the link training period, whether to enable at least one FEC mode for use by the network node element based on, at least in part, the at least one channel quality parameter.

Another example network node element includes the forgoing and further defines that the channel quality parameter is selected from the group of a bit error ratio (BER), signal-to-noise ratio (SNR), cross talk, environmental noise, linearity or impulse response.

Another example network node element includes the forgoing and further defines that the network controller is further configured to format a link codeword base page with a flag indicating the request to resolve at least one FEC mode during a link training period.

Another example network node element includes the forgoing and further defines that the network controller is further configured to format a coefficient update field with at least one flag indicating the FEC mode capabilities of the network controller.

Another example network node element includes the forgoing and further defines that the network controller is further configured to format a status report field with at least one flag indicating the FEC mode capabilities of the network controller.

Another example network node element includes the forgoing and further defines that the network controller is further configured to select, from among a plurality of FEC modes, one mode to enable based on, at least in part, the at least one channel quality parameter.

Another example network node element includes the forgoing and further defines that the plurality of FEC modes includes a first FEC mode and a second FEC mode and wherein the first FEC mode has less coding gain than the second FEC mode.

Another example network node element includes the forgoing and further defines that the Ethernet communications protocol complies with an Institute of Electrical and Electronic Engineers 802.3 Ethernet communications protocol.

The present disclosure also provides a node element that includes a network controller configured to communicate with a link partner using an Ethernet communications protocol. The network controller includes an auto-negotiation module configured to format a link code word base page to request, during an auto-negotiation period, to resolve at least one forward error correction (FEC) mode during a link training period. The auto-negotiation period and the link training period are defined by an Ethernet communications protocol and the auto-negotiation period occurs before the link training period. The network controller further includes a link training module configured to determine, during the link training period, at least one channel quality parameter of at least one channel of a communication link between the network controller and the link partner; and determine, during the link training period, whether to enable at least one FEC mode for use by the network controller based on, at least in part, the at least one channel quality parameter.

Another example node element includes the forgoing and further defines that the channel quality parameter is selected from the group of a bit error rate (BER), signal-to-noise ratio (SNR), cross talk, environmental noise, linearity or impulse response.

Another example node element includes the forgoing and further defines that the link training module is further configured to format a coefficient update field with at least one flag indicating the FEC mode capabilities of the network controller.

Another example node element includes the forgoing and further defines that the link training module is further configured to format a status report field with at least one flag indicating the FEC mode capabilities of the network controller.

Another example node element includes the forgoing and further defines that the link training module is further configured to select, from among a plurality of FEC modes, one mode to enable based on, at least in part, the at least one channel quality parameter.

Another example node element includes the forgoing and further defines that the plurality of FEC modes includes a first FEC mode and a second FEC mode and wherein the first FEC mode has less coding gain than the second FEC mode.

Another example node element includes the forgoing and further defines that the Ethernet communications protocol complies with an Institute of Electrical and Electronics Engineers 802.3 Ethernet communications protocol.

The present disclosure also provides a system that includes a network node element configured to communicate using an Ethernet communications protocol, and a link partner configured to communicate with the network node element using the Ethernet communications protocol. The network node element is further configured to request, during an auto-negotiation period, to resolve at least one forward error correction (FEC) mode during a link training period; wherein the auto-negotiation period and the link training period are defined by an Ethernet communications protocol and the auto-negotiation period occurs before the link training period. The network node element is further configured to determine, during the link training period, at least one channel quality parameter of at least one channel of a communication link between the network node element and the link partner; and determine, during the link training period, whether to enable at least one FEC mode for use by the network node element based on, at least in part, the at least one channel quality parameter.

Another example system includes the forgoing and further defines that the channel quality parameter is selected from the group of a bit error rate (BER), signal-to-noise ratio (SNR), cross talk, environmental noise, linearity or impulse response.

Another example system includes the forgoing and further defines that the network controller is further configured to format a link codeword base page with a flag indicating the request to resolve at least one FEC mode during a link training period.

Another example system includes the forgoing and further defines that the network controller is further configured to format a coefficient update field with at least one flag indicating the FEC mode capabilities of the network controller.

Another example system includes the forgoing and further defines that the network controller is further configured to format a status report field with at least one flag indicating the FEC mode capabilities of the network controller.

Another example system includes the forgoing and further defines that the network controller is further configured to select, from among a plurality of FEC modes, one mode to enable based on, at least in part, the at least one channel quality parameter.

Another example system includes the forgoing and further defines that the plurality of FEC modes includes a first FEC mode and a second FEC mode and wherein the first FEC mode has less coding gain than the second FEC mode.

Another example system includes the forgoing and further defines that the Ethernet communications protocol complies with an Institute of Electrical and Electronics Engineers 802.3 Ethernet communications protocol.

The present disclosure also provides a method for resolving a forward error correction (FEC) protocol that includes requesting, by a network node element during an auto-negotiation period between the node element and a link partner, to resolve at least one FEC mode during a link training period. The auto-negotiation period and the link training period are defined by an Ethernet communications protocol and the auto-negotiation period occurs before the link training period. The method also includes determining, by the network node element, at least one channel quality parameter of at least one channel of a communication link between the network node element and the link partner; and determining, by the network node element during the link training period, whether to enable at least one FEC mode for use by the network node element based on, at least in part, the at least one channel quality parameter.

Another example method includes the foregoing operations and further defines that the channel quality parameter is selected from the group of a bit error rate (BER), signal-to-noise ratio (SNR), cross talk, environmental noise, linearity or impulse response.

Another example method includes the foregoing operations and further includes formatting, by the network node element, a link codeword base page with a flag indicating the request to resolve at least one FEC mode during a link training period.

Another example method includes the foregoing operations and further includes formatting, by the network node element, a coefficient update field with at least one flag indicating the FEC mode capabilities of the network controller.

Another example method includes the foregoing operations and further includes formatting, by the network node element, a status report field with at least one flag indicating the FEC mode capabilities of the network controller.

Another example method includes the foregoing operations and further includes selecting, from among a plurality of FEC modes, one mode to enable based on, at least in part, the at least one channel quality parameter.

Another example method includes the foregoing operations and further defines that the plurality of FEC modes includes a first FEC mode and a second FEC mode and wherein the first FEC mode has less coding gain than the second FEC mode.

Another example method includes the foregoing operations and further defines that the Ethernet communications protocol complies with an Institute of Electrical and Electronics Engineers 802.3 Ethernet communications protocol.

The present disclosure also provides a system that is configured to perform any of the foregoing operations of the example method. The system includes one or more storage mediums having stored thereon, individually or in combination, instructions that when executed by one or more processors result in the following operations that include any of the foregoing operations of the example method.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A network node element, comprising:
a network controller configured to communicate with a link partner using an Ethernet communications protocol; the network controller further configured to:
request, during an auto-negotiation period, to delay resolving at least one forward error correction (FEC) mode until during a link training period; wherein the auto-negotiation period and the link training period are defined by an Ethernet communications protocol and the auto-negotiation period occurs before the link training period;
determine, during the link training period, at least one channel quality parameter of at least one channel of a communication link between the network controller and the link partner; and
determine, during the link training period, whether to enable at least one FEC mode for use by the network node element based on, at least in part, the at least one channel quality parameter.

2. The network node element of claim 1, wherein the channel quality parameter is selected from the group of a bit error rate (BER), signal-to-noise ratio (SNR), cross talk, environmental noise, linearity or impulse response.

3. The network node element of claim 1, wherein the network controller is further configured to format a link codeword base page with a flag indicating the request to resolve at least one FEC mode during a link training period.

4. The network node element of claim 1, wherein the network controller is further configured to format a coefficient update field with at least one flag indicating the FEC mode capabilities of the network controller.

5. The network node element of claim 1, wherein the network controller is further configured to format a status report field with at least one flag indicating the FEC mode capabilities of the network controller.

6. The network node element of claim 1, wherein the network controller is further configured to select, from among a plurality of FEC modes, one mode to enable based on, at least in part, the at least one channel quality parameter.

7. The network node element of claim 6, wherein the plurality of FEC modes includes a first FEC mode and a second FEC mode and wherein the first FEC mode has less coding gain than the second FEC mode.

8. The network node element of claim 1, wherein the Ethernet communications protocol complies with an Institute of Electrical and Electronics Engineers 802.3 Ethernet communications protocol.

9. A node element, comprising:
a network controller configured to communicate with a link partner using an Ethernet communications protocol; the network controller comprising an auto-negotiation module configured to:
format a link code word base page to request, during an auto-negotiation period, to delay resolving at least one forward error correction (FEC) mode until during a link training period; wherein the auto-negotiation period and the link training period are defined by an Ethernet communications protocol and the auto-negotiation period occurs before the link training period;
the network controller further comprising a link training module configured to:
determine, during the link training period, at least one channel quality parameter of at least one channel of a communication link between the network controller and the link partner; and
determine, during the link training period, whether to enable at least one FEC mode for use by the network controller based on, at least in part, the at least one channel quality parameter.

10. The network node element of claim 9, wherein the channel quality parameter is selected from the group of a bit error rate (BER), signal-to-noise ratio (SNR), cross talk, environmental noise, linearity or impulse response.

11. The node element of claim 9, wherein the link training module is further configured to format a coefficient update field with at least one flag indicating the FEC mode capabilities of the network controller.

12. The node element of claim 9, wherein the link training module is further configured to format a status report field with at least one flag indicating the FEC mode capabilities of the network controller.

13. The node element of claim 9, wherein the link training module is further configured to select, from among a plurality of FEC modes, one mode to enable based on, at least in part, the at least one channel quality parameter.

14. The node element of claim 13, wherein the plurality of FEC modes includes a first FEC mode and a second FEC mode and wherein the first FEC mode has less coding gain than the second FEC mode.

15. The node element of claim 9, wherein the Ethernet communications protocol complies with an Institute of Electrical and Electronics Engineers 802.3 Ethernet communications protocol.

16. A system comprising one or more non-transitory storage mediums having stored thereon, individually or in combination, instructions that when executed by one or more processors result in the following operations comprising:
- request, by a network node element during an auto-negotiation period between the node element and a link partner, to delay resolving at least one FEC mode until during a link training period; wherein the auto-negotiation period and the link training period are defined by an Ethernet communications protocol and the auto-negotiation period occurs before the link training period;
- determine, by the network node element, at least one channel quality parameter of at least one channel of a communication link between the network node element and the link partner; and
- determine, by the network node element during the link training period, whether to enable at least one FEC mode for use by the network node element based on, at least in part, the at least one channel quality parameter.

17. The system of claim 16, wherein the channel quality parameter is selected from the group of a bit error rate (BER), signal-to-noise ratio (SNR), cross talk, environmental noise, linearity or impulse response.

18. The system of claim 16, further comprising instructions that result in the following operations comprising: format, by the network node element, a link codeword base page with a flag indicating the request to resolve at least one FEC mode during a link training period.

19. The system of claim 16, further comprising instructions that result in the following operations comprising: format, by the network node element, a coefficient update field with at least one flag indicating the FEC mode capabilities of the network controller.

20. The system of claim 16, further comprising instructions that result in the following operations comprising: format, by the network node element, a status report field with at least one flag indicating the FEC mode capabilities of the network controller.

21. The system of claim 16, further comprising instructions that result in the following operations comprising: select, from among a plurality of FEC modes, one mode to enable based on, at least in part, the at least one channel quality parameter.

22. The system of claim 16, wherein the plurality of FEC modes includes a first FEC mode and a second FEC mode and wherein the first FEC mode has less coding gain than the second FEC mode.

23. The system of claim 16, wherein the Ethernet communications protocol complies with an Institute of Electronic Engineers 802.3 Ethernet communications protocol.

24. A method for resolving a forward error correction (FEC) protocol, comprising:
- requesting, by a network node element during an auto-negotiation period between the node element and a link partner, to delay resolving at least one FEC mode until during a link training period; wherein the auto-negotiation period and the link training period are defined by an Ethernet communications protocol and the auto-negotiation period occurs before the link training period;
- determining, by the network node element, at least one channel quality parameter of at least one channel of a communication link between the network node element and the link partner; and
- determining, by the network node element during the link training period, whether to enable at least one FEC mode for use by the network node element based on, at least in part, the at least one channel quality parameter.

25. The method of claim 24, wherein the channel quality parameter is selected from the group of a bit error rate (BER), signal-to-noise ratio (SNR), cross talk, environmental noise, linearity or impulse response.

26. The method of claim 24, further comprising formatting, by the network node element, a link codeword base page with a flag indicating the request to resolve at least one FEC mode during a link training period.

27. The method of claim 24, further comprising formatting, by the network node element, a coefficient update field with at least one flag indicating the FEC mode capabilities of the network controller.

28. The method of claim 24, further comprising formatting, by the network node element, a status report field with at least one flag indicating the FEC mode capabilities of the network controller.

29. The method of claim 24, further comprising selecting, from among a plurality of FEC modes, one mode to enable based on, at least in part, the at least one channel quality parameter.

30. The method of claim 24, wherein the plurality of FEC modes includes a first FEC mode and a second FEC mode and wherein the first FEC mode has less coding gain than the second FEC mode.

* * * * *